Patented Nov. 5, 1929

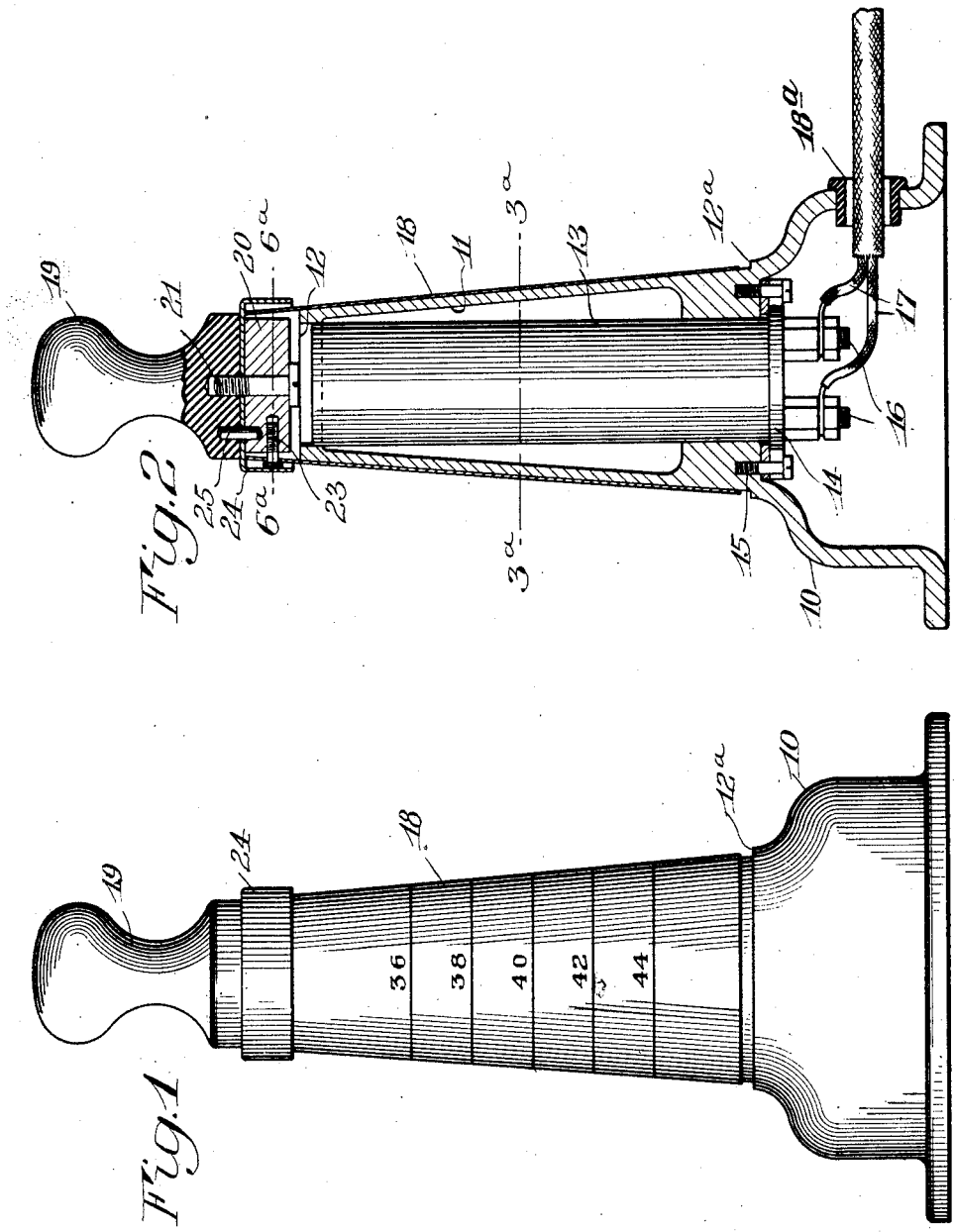

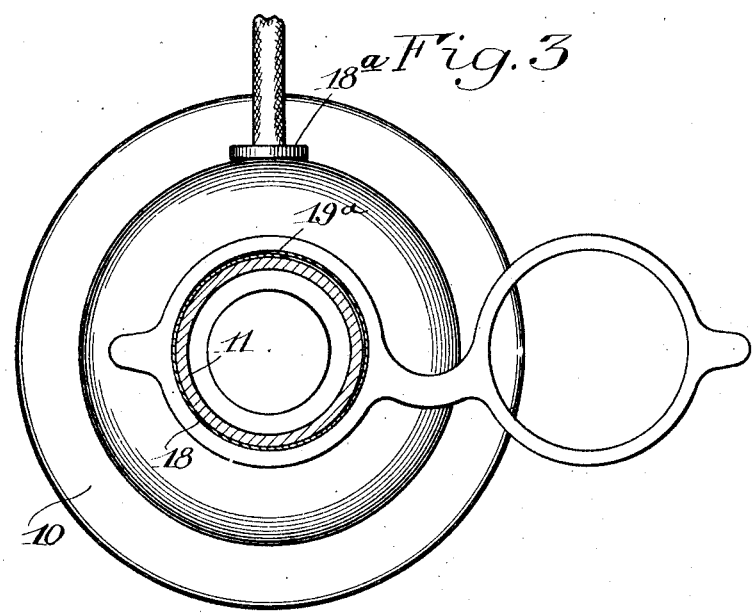
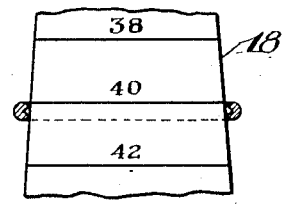
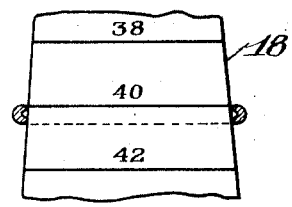
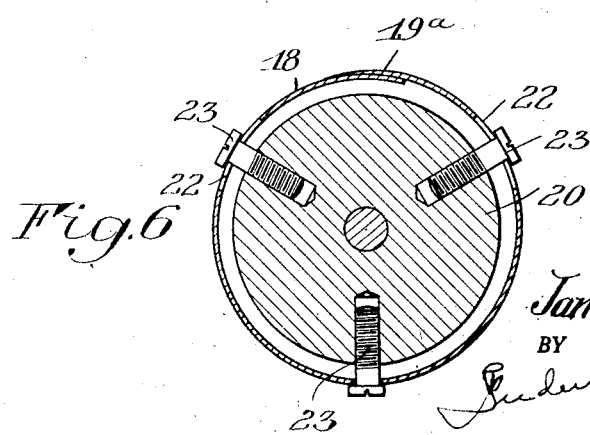

1,734,411

UNITED STATES PATENT OFFICE

JAMES W. WELSH, OF ROCHESTER, NEW YORK, ASSIGNOR TO BAUSCH & LOMB OPTICAL COMPANY, OF ROCHESTER, NEW YORK, A CORPORATION OF NEW YORK

RIM-STRETCHING DEVICE FOR EYEGLASS AND SPECTACLE FRAMES

Application filed December 26, 1924. Serial No. 757,975.

This invention relates to rim stretching devices for eye glass and spectacle frames constructed of a material adapted to be softened by the application of heat, for the purpose, for example, of stretching the rims for the reception of over-sized lenses, the chief object of the invention being to provide an improved device of this character having a simplified form of construction comprising but few parts of an inexpensive nature and capable of being operated in a convenient, accurate and expeditious manner.

To these and other ends the invention resides in certain improvements and combinations of parts, all as will be hereinafter more fully described, the novel features being pointed out in the claims at the end of the specification.

In the drawings:—

Fig. 1 is an elevation of a device embodying the present invention;

Fig. 2 is a central vertical sectional view of the same;

Fig. 3 is an enlarged sectional view on the line 3ª—3ª in Figure 2;

Figs. 4 and 5 are fragmentary views showing a rim applied to the device in operation before and after stretching, respectively, and Fig. 6 is an enlarged sectional view on the line 6ª—6ª of Figure 2 illustrating structural features.

Similar reference numerals throughout the several views indicate the same parts.

The preferred embodiment of the invention comprises a supporting base 10 from which rises an expanding member or core 11 of progressively graduated size and in the present instance in the form of a truncated cone having an upper end 12. The base 10 is formed with a shoulder 12ª at the base of the cone for a purpose hereafter described. The base and cone 11 are of hollow construction, being preferably and conveniently formed as an integral casting. Cone 11 is adapted to serve as a longitudinally tapered core for engagement within an expansible former, or sleeve, to which the rim to be stretched is applied, as hereafter described, and the cone is provided interiorly with means for heating the same and the cooperating forming sleeve and rim for softening the latter for stretching.

The heating means for the device is preferably of an electrical character and in the present instance in the form of an electrical resistance of any known or suitable character enclosed within a cylindrical casing 13, the ends of which are fitted in the ends of the cone while its lower end carries a flange 14 secured as by screws 15 to the base of the cone. The heating element 13 is provided with binding posts 16 connected with the terminals of the heating resistance for connecting the latter in circuit with leads 17 passing through an insulated opening 18ª in the side of base 10 as shown.

The expansible former to which the rim to be stretched is applied is preferably in the nature of an expansible conical sleeve 18 corresponding in shape to the cone 11 and adapted to be applied over the latter and pressed longitudinally downward on the same to expand the rim carried by the sleeve. The sleeve 18 is preferably constructed of a sheet of relatively thin, flexible metal the opposite edges of which are brought loosely together in sliding overlapping relation as at 19ª, Figures 3 and 6, and flexibly held in such relation by a loose connection at its upper end with an operating handle or knob 19. The latter is advantageously constructed of heat insulating material and has a block or disc 20 secured on its lower end as by means of a screw 21. The upper end of sleeve 18 embraces block 20 and is formed with horizontal slots 22 in which are engaged screws 23 carried by the block which securely support the sleeve on its handle but leave it free to contract and expand with relative sliding of its overlapping edges. A cup-shaped housing 24 encloses the attachment of the sleeve to the block and is held between the latter and the handle and a dowel pin 25 further secures the block and handle together and prevents their relative rotation.

Sleeve 18 is provided with a scale comprising longitudinally spaced rings corresponding in size with and marked to indicate lenses of different sizes to which it is desired to stretch the rims. A rim is engaged over the handle and pressed downwardly on the sleeve to register with the ring of the size to which the rim is to be stretched, such application of the rim being made of course with the sleeve 18 removed from or elevated on cone 11 to permit the sleeve to be contracted. The heating current having been turned on with the sleeve carrying the rim fitted loosely to the cone, the parts are allowed to heat until the material of the rim is sufficiently softened for stretching. The sleeve is then pressed downwardly on the cone until its lower end is seated against the base shoulder 12ª, whereby the rim is stretched to the desired size. The sleeve may then be elevated on the cone and the rim removed to receive the lens. It is apparent therefore that the device is exceedingly simple and convenient to operate, as well as simple and durable in construction, comprising but few parts of practical form capable of being manufactured and assembled at a comparatively small expense.

I claim as my invention:

1. In a device of the class described, the combination of a handle, a flexible metal sheet having opposite edges thereof brought slidably together to form an expansible conical sleeve open at its larger end and loosely connected at the other to said handle, said sleeve being adapted to have a rim to be stretched applied over the handle end thereof to encircle an intermediate portion of the sleeve corresponding to the desired size of the rim, a conically tapered core for engagement within said sleeve to expand the same and means for heating said core and sleeve to heat a rim while being stretched on the sleeve.

2. In a device for expanding rims and the like, an expansible form having different cross sectional dimensions at different points along its length, and a tapered core received in and expanding said form when given relative endwise movement therein, said core and form having cooperating parts to limit definitely their relative movement and thereby limit the expansion of said form, whereby when a rim to be expanded is placed upon a particular section of the form and heated while the form is being expanded by said relative movement, it will be expanded up to and not exceeding a definite predetermined size, depending upon its position upon the form.

3. In a device for expanding rims and the like, an expansible form having different cross sectional dimensions at different points along its length, a tapered core received in and expanding said form when given relative endwise movement therein, said core and form having cooperating parts to limit definitely their relative movement and thereby limit the expansion of said form, and means for heating said form and through it said rim while the form is being expanded, whereby when a rim to be expanded is placed upon a particular section of the form and heated while the form is being expanded by said relative movement, it will be expanded up to and not exceeding a definite predetermined size, depending upon its position upon the form.

JAMES W. WELSH.